US012646766B2

(12) United States Patent
Hofmann et al.

(10) Patent No.: US 12,646,766 B2
(45) Date of Patent: Jun. 2, 2026

(54) LINE INSTALLATION DEVICE FOR A HIGH-VOLTAGE BATTERY OF A MOTOR VEHICLE, LINE ARRANGEMENT, HIGH-VOLTAGE BATTERY AND MOTOR VEHICLE

(71) Applicant: Bayerische Motoren Werke Aktiengesellschaft, Munich (DE)

(72) Inventors: Christian Hofmann, Munich (DE); Philipp Schlag, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/978,984

(22) PCT Filed: Jul. 15, 2019

(86) PCT No.: PCT/EP2019/068948
§ 371 (c)(1),
(2) Date: Sep. 8, 2020

(87) PCT Pub. No.: WO2020/035241
PCT Pub. Date: Feb. 20, 2020

(65) Prior Publication Data
US 2020/0411931 A1 Dec. 31, 2020

(30) Foreign Application Priority Data
Aug. 13, 2018 (DE) ..................... 10 2018 213 596.7

(51) Int. Cl.
*H01M 10/6568* (2014.01)
*B60L 50/64* (2019.01)
(Continued)

(52) U.S. Cl.
CPC ......... *H01M 10/6568* (2015.04); *B60L 50/64* (2019.02); *F16L 3/2235* (2013.01);
(Continued)

(58) Field of Classification Search
CPC ............. F16L 3/00–26; H01M 10/613; H01M 10/631; H01M 10/625; H01M 10/6568;
(Continued)

(56) References Cited

U.S. PATENT DOCUMENTS 5,669,590 A * 9/1997 Przewodek ............. F16L 3/237
248/68.1
6,430,945 B1 8/2002 Haussmann
(Continued)

FOREIGN PATENT DOCUMENTS

CN 1287607 A 3/2001
CN 102217133 A 10/2011
(Continued)

OTHER PUBLICATIONS

International Search Report (PCT/ISA/210) issued in PCT Application No. PCT/EP2019/068948 dated Aug. 26, 2019 with English translation (five pages).
(Continued)

*Primary Examiner* — Stewart A Fraser
*Assistant Examiner* — Lilia Nedialkova
(74) *Attorney, Agent, or Firm* — Crowell & Moring LLP

(57) ABSTRACT
A line installation device is provided for a high-voltage battery of a motor vehicle for installing lines of the high-voltage battery on at least one battery module of the high-voltage battery. At least one line clip retains at least one first line in the form of an electrical line and retains at least one second line in the form of a coolant line. The line clip is designed to guide the lines as a line bundle over a side of the at least one battery module having degassing openings of battery cells of the at least one battery module. The line clip has a refractory material for protecting the lines against a hot gas passing out of the degassing openings.

10 Claims, 1 Drawing Sheet

(51) Int. Cl.
*F16L 3/223* (2006.01)
*H01M 10/613* (2014.01)
*H01M 10/625* (2014.01)
*H01M 50/50* (2021.01)

(52) U.S. Cl.
CPC ....... *H01M 10/613* (2015.04); *H01M 10/625* (2015.04); *H01M 50/50* (2021.01)

(58) Field of Classification Search
CPC .. H01M 50/342; H01M 50/50; H01M 2/1077; H01M 2/1083; B60L 50/64; Y02E 60/10; Y02P 70/50; Y02T 10/70
See application file for complete search history.

(56) References Cited

U.S. PATENT DOCUMENTS

| | | | | |
|---|---|---|---|---|
| 2007/0087266 | A1* | 4/2007 | Bourke | H01M 50/207 429/61 |
| 2007/0120022 | A1* | 5/2007 | Trotter | F16B 5/0685 248/49 |
| 2007/0137882 | A1* | 6/2007 | Journeaux | H02G 3/32 174/135 |
| 2008/0057776 | A1 | 3/2008 | Cummings | |
| 2008/0272268 | A1* | 11/2008 | Zimmermann | F02F 7/0068 248/687 |
| 2011/0244298 | A1 | 10/2011 | Guener et al. | |
| 2012/0244397 | A1* | 9/2012 | TenHouten | H01M 10/6561 429/61 |
| 2016/0109037 | A1 | 4/2016 | Tsuchiya | |
| 2017/0104252 | A1 | 4/2017 | Wuesche et al. | |
| 2017/0346053 | A1 | 11/2017 | Acikgoez et al. | |
| 2017/0346142 | A1 | 11/2017 | Landerer et al. | |
| 2018/0109096 | A1* | 4/2018 | Gintz | H02G 3/305 |
| 2018/0128375 | A1* | 5/2018 | Miller | F16J 15/102 |
| 2019/0002967 | A1* | 1/2019 | Chen | C12Q 1/6865 |
| 2019/0319437 | A1* | 10/2019 | Chu | H02G 3/0691 |
| 2020/0028135 | A1* | 1/2020 | Shepherd | H01M 50/209 |
| 2020/0062925 | A1* | 2/2020 | Tamai | C08K 5/378 |
| 2020/0172709 | A1* | 6/2020 | Bauer | C08K 5/526 |

FOREIGN PATENT DOCUMENTS

| | | | | |
|---|---|---|---|---|
| CN | 203273032 | U | 11/2013 | |
| CN | 104795609 | A | 7/2015 | |
| CN | 106935927 | A | 7/2017 | |
| CN | 107210500 | A | 9/2017 | |
| DE | 10 2004 032 053 | A1 | 3/2006 | |
| DE | 10 2014 200 978 | A1 | 7/2015 | |
| DE | 10 2018 000 284 | A1 | 7/2018 | |
| EP | 0 954 078 | A1 | 11/1999 | |
| EP | 2 839 195 | B1 | 9/2018 | |
| JP | 2016-55843 | A | 4/2016 | |
| WO | WO-2007047317 | A2 * | 4/2007 | ........ H01M 10/4207 |
| WO | WO 2012/000606 | A1 | 1/2012 | |
| WO | WO 2018/092686 | A1 | 5/2018 | |

OTHER PUBLICATIONS

German-language Written Opinion (PCT/ISA/237) issued in PCT Application No. PCT/EP2019/068948 dated Aug. 26, 2019 (seven pages).

German-language Office Action issued in German Application No. 10 2018 213 596.7 dated May 9, 2019 with English translation (12 pages).

German-language Decision to Grant issued in German Application No. 10 2018 213 596.7 dated Sep. 19, 2019 with English translation (16 pages).

Chinese-language Office Action issued in Chinese Application No. 201980020963.9 dated May 17, 2023 with English translation (15 pages).

* cited by examiner

LINE INSTALLATION DEVICE FOR A HIGH-VOLTAGE BATTERY OF A MOTOR VEHICLE, LINE ARRANGEMENT, HIGH-VOLTAGE BATTERY AND MOTOR VEHICLE

BACKGROUND AND SUMMARY OF THE INVENTION

The invention relates to a line installation device for a high-voltage battery of a motor vehicle for installing lines of the high-voltage battery on at least one battery module of the high-voltage battery. The invention also relates to a line arrangement, a high-voltage battery and a motor vehicle.

At present, there is an interest in high-voltage batteries or rechargeable high-voltage batteries for electrically drivable motor vehicles, for example electric or hybrid vehicles. The high-voltage battery can be electrically connected to a high-voltage load, for example an electrical drive machine of the motor vehicle, via high-voltage lines and have a large number of battery modules. Each battery module can in turn have a large number of battery cells which are stacked to form a cell stack and are interconnected with one another. In order to prevent overheating of the battery cells during operation, the battery cells are usually cooled. To this end, a cooling plate in which a coolant is conducted and guided along the side of the cell stack can be arranged on a side of the cell stack of a battery module, for example on a bottom side of the cell stack. The cooling plate usually has a coolant connection for conducting coolant into the cooling plate and for removing coolant from the cooling plate. The coolant connection can be coupled, for example, to coolant lines of a cooling circuit of the high-voltage battery.

In this case, the electrical lines and the coolant lines are usually individually mounted on the high-voltage battery and guided along a top side of the battery modules. Owing to the lines being fastened separately, mounting of the lines is time-consuming and costly. In addition, degassing openings of the battery cells are located on the top side of the battery modules. These degassing openings serve to discharge a hot gas which is produced in a cell housing of a battery cell, for example in the event of a cell-internal short circuit, out of the cell housing. In this case, the hot gas can be at temperatures of up to 1200° C. and as a result destroy the lines which are likewise arranged on the top side of the battery module.

The object of the present invention is to provide a solution by way of which lines of a high-voltage battery for a motor vehicle can be laid in the high-voltage battery in a particularly simple and uncomplicated manner and also in a manner protected against hot gas.

According to the invention, this object is achieved by a line installation device, a line arrangement, a high-voltage battery and a motor vehicle having the features according to the respective independent patent claims. Advantageous embodiments of the invention are the subject matter of the dependent patent claims, the description and the figures.

A line installation device according to the invention for a high-voltage battery of a motor vehicle serves for laying lines of the high-voltage battery on at least one battery module of the high-voltage battery. The line installation device has at least one line clip for retaining at least one first line in the form of an electrical line and for retaining at least one second line in the form of a coolant line. The at least one line clip is designed to guide the lines as a line bundle over a side of the at least one battery module, which side has degassing openings of battery cells of the at least one battery module. Furthermore, the at least one line clip contains a refractory material for protecting the lines against a hot gas which passes out of the degassing openings.

The invention also relates to a line arrangement for a high-voltage battery of a motor vehicle comprising at least one electrical line, at least one coolant line and a line installation device according to the invention. The invention further relates to a high-voltage battery for a motor vehicle comprising at least one battery module which has a cell stack composed of battery cells which are stacked one on the other along a stacking direction, and comprising a line arrangement according to the invention, the line installation device of the line arrangement being designed to guide the lines over that side of the battery module which has the degassing openings substantially perpendicularly in relation to the stacking direction. In particular, the at least one line clip is arranged between two degassing openings of two adjacent battery cells of the at least one battery module.

The rechargeable high-voltage battery can have a large number of battery modules which are interconnected with one another, wherein each battery module can in turn have a large number of prismatic battery cells or secondary cells which are stacked along a stacking direction to form a cell stack. In this case, the high-voltage battery has at least one electrical line or at least one electrical cable. In particular, the high-voltage battery has a plurality of electrical lines which can be, for example, high-voltage lines and/or module connecting lines. The battery modules can be electrically connected to high-voltage components of the motor vehicle and/or to one another via electrical lines of this kind. The electrical lines are designed, in particular, as round conductors. The electrical lines can also comprise low-voltage lines via which the individual battery cells are electrically connected to a cell monitoring system for communication purposes.

In order to cool the battery cells during operation of the high-voltage battery, the high-voltage battery can have a cooling device. The cooling device can comprise, for example, cooling plates which can be arranged on bottom sides of the battery modules and have cooling ducts for conducting coolant. The cooling plates can be connected to the at least one coolant line of a cooling circuit of the high-voltage battery, via which coolant line the coolant can be conducted into the cooling ducts of the cooling plates and/or can be removed from the cooling ducts of the cooling plates. In particular, the high-voltage battery has a first coolant line in the form of an inlet line and a second coolant line in the form of an outlet line.

The line installation device is used for laying or fastening the lines on the battery modules of the high-voltage battery. This line installation device, fitted with the lines, can be arranged on the battery modules. In other words, the lines can be premounted on the line installation device and laid or fastened on the battery modules by means of the line installation device. The line installation device is therefore designed to combine the lines to form the line bundle and serves as a framework ("backbone") for retaining the line bundle.

The line installation device has, in particular for each battery module, a line clip for laying the lines on the battery module. The line clip encloses the lines in a length section along a direction of extent of the lines. To this end, the line clip can have a plurality of passage openings or a continuous passage region through which the lines are guided. The lines can be supported on the battery module by means of the line clip and can be guided over the battery module in a predetermined position in relation to one another, that is to say at predetermined minimum distances and/or tolerances. This means, for example, that predetermined tolerances and minimum distances of the lines in relation to one another are already taken into account by the arrangement of the lines in the line clip. For example, the line clip is designed to guide the lines substantially parallel in relation to one another along the direction of extent of the lines. The direction of extent of the lines corresponds, in particular, to a width direction of the battery modules which is oriented transversely in relation to the stacking direction of the battery cells. For example, a plurality of battery modules can be arranged next to one another along the width direction, so that the lines extend over the plurality of battery modules.

In this case, cell housings of the prismatic battery cells have degassing openings through which a hot gas which is produced in the event of damage to a battery cell in the cell housing of the battery cell can escape from the cell housing. In this case, the degassing openings are usually arranged on top sides of the cell housings, which top sides form a top side of the battery module. The lines are also guided along the top side of the battery module. In order to now prevent the lines from being destroyed by the hot gas of a degassing battery cell, the lines are surrounded by the line clip along that length section which lies in a degassing path of the battery cell. The lines are supported within a battery module, that is to say in a region of the top side which has at least one degassing opening, and in this way are protected by the line clip. To this end, the line clip contains the refractory material which lies in the degassing path between the degassing opening and the lines. Here, a refractory material is understood to mean, in particular, a material which is heat-resistant up to a temperature of the hot gas, in particular up to 1200° C.

The use of the line installation device produces the advantage that the lines have a low space requirement in the high-voltage battery since tolerances or minimum distances which are intended to be complied with between the lines can be kept as small as possible. In addition, the lines can be fastened to the battery modules with a lower level of expenditure on mounting. The lines can also be protected against being destroyed by hot gas of a degassing battery cell owing to the design of the line clip with the refractory material. Therefore, the line installation device is of multifunctional design.

In this case, it can be provided that the line clip is formed, at least in regions, from a refractory material in the form of a flameproof polyamide, in particular a glass fiber-reinforced polyamide which is admixed with red phosphorus. A polyamide of this kind can be, for example, the polyamide with the DIN abbreviation PA 66 GF 30. The line clip is preferably entirely or completely formed from the flameproof polyamide. A line clip of this kind can be produced in a particularly simple manner, for example by injection molding.

It can also be provided that the line clip is coated, at least in regions, with a refractory material in the form of a metal material. For example, the line clip can be formed from plastic and have a metal coating. For example, the line clip can be coated only on an outer side which faces the degassing opening and has the metal coating. The metal coating can be applied, for example, by cold plasma spraying or in-mold metal spraying onto the material of the line clip, for example the plastic.

In one embodiment of the invention, the line clip has a bottom part, which faces the side with the degassing openings of the at least one battery module, and a top part which is situated opposite the bottom part, wherein the lines are arranged between the bottom part and the top part, and wherein at least one outer side which faces the side with the degassing openings of the at least one battery module is formed from the refractory material. The line clip is therefore formed from two halves, specifically the bottom part and the top part. For example, at least the bottom part can be completely formed from the flameproof polyamide, or the outer side of the bottom part can be coated with the metal material.

In this case, it can be provided that the top part and the bottom part are connected by means of a hinge on one side. The top part and the bottom part are therefore arranged such that they can be folded in relation to one another, so that the top part and the bottom part can be folded apart in order to arrange or premount the lines between the top part and the bottom part. After the lines are arranged between the top part and the bottom part, the top part and the bottom part can be folded together again and can be connected to one another in an interlocking manner, for example by means of a snap-action connection. The lines can be premounted in a particularly simple and convenient manner owing to the foldable design.

The line clip is particularly preferably of two-part design, wherein the top part and the bottom part are connected in an interlocking manner by means of a snap-action connection. The top part and the bottom part can therefore be completely detached from one another in order to premount the lines and can be joined together again after mounting. The top part and the bottom part have snap-action elements, for example snap-action hooks, which correspond to one another in order to form the snap-action connection. A snap-action connection of this kind can be released without being destroyed, so that lines can be replaced in a simple manner, for example in the event of damage.

It has proven advantageous when the bottom part has at least one passage opening for guiding a coolant connection of the coolant lines through to at least one coolant nozzle of a cooling device of the at least one battery module. The cooling device has, in particular, two coolant nozzles, specifically an inlet nozzle and an outlet nozzle. The coolant nozzles serve to fluidically couple the cooling device, which is designed in particular as a cooling plate and is arranged on the bottom side of the battery module, to the coolant lines which are laid on the top side of the battery module. To this end, the coolant nozzles can be guided, for example through an intermediate pressure plate which is arranged between two battery cells of a battery module, from the bottom side of the battery module to the top side of the battery module. To this end, the intermediate pressure plate can have passage openings which extend from the bottom side to the top side of the battery module and into which the coolant nozzles of the cooling plate can be inserted. In this case, the coolant lines have a coolant connection which is formed, for example, from two T-shaped elements. In this case, one T-shaped element can be connected to the inlet line and the inlet nozzle, and one T-shaped element can be connected to the outlet line and the outlet nozzle. The two T-shaped elements can be connected to one another, for example, in such a way that the coolant connection is of one-piece or monolithic design. The coolant connection is therefore designed as a double-T piece.

In order to guide the coolant connection from the coolant lines to the coolant nozzles, the bottom part of the line clip has the passage opening. When the lines are premounted on the line clip, the electrical lines can be fastened to the housing top part. The coolant lines are arranged in the bottom part and in this case are passed through the passage opening. The top part can then be fastened on the bottom part, and the line arrangement can be fastened to the battery module by plugging the coolant connection onto the at least one coolant nozzle of the cooling plate.

The invention also covers a motor vehicle which comprises a high-voltage battery according to the invention. The motor vehicle is designed, in particular, as an electric or hybrid vehicle.

The embodiments presented with reference to the line installation device according to the invention and the advantages of the embodiments correspondingly apply to the line arrangement according to the invention, to the high-voltage battery according to the invention and to the motor vehicle according to the invention.

Further features of the invention can be found in the claims, the figures and the description of the figures. The features and combinations of features mentioned above in the description and the features and combinations of features mentioned below in the description of the figures and/or shown in the figures alone can be used not only in the respectively indicated combination but also in other combinations or on their own.

The invention will now be explained in more detail with reference to a preferred exemplary embodiment and with reference to the drawings.

BRIEF DESCRIPTION OF THE DRAWINGS

In the figures, identical and functionally identical elements are provided with the same reference signs.

DETAILED DESCRIPTION OF THE DRAWINGS

Figure 1:
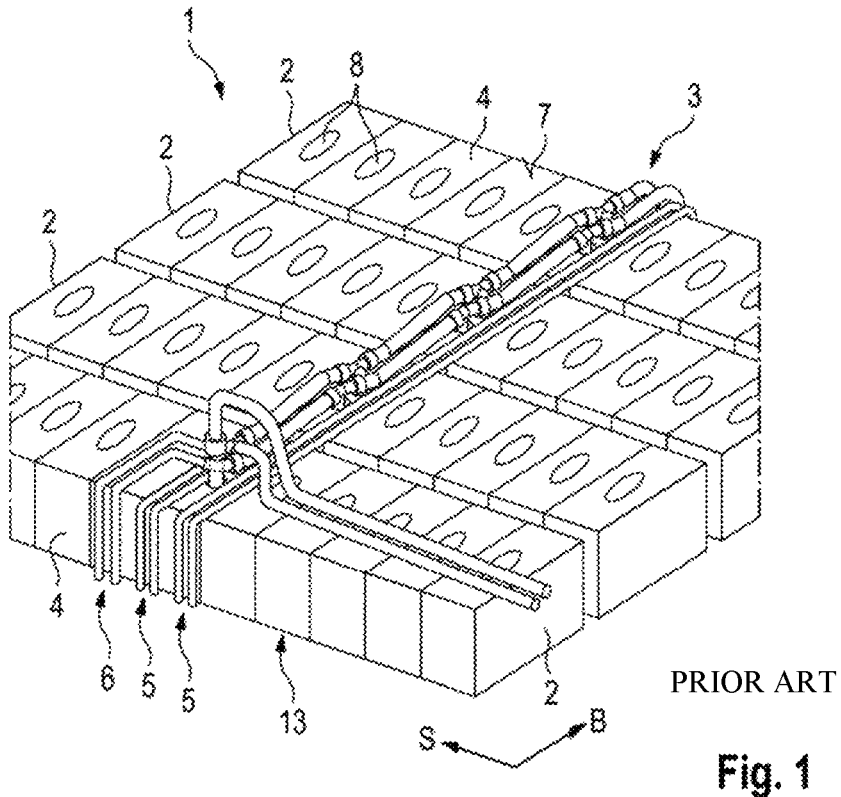
FIG. 1 is a schematic illustration of a high-voltage battery comprising a line arrangement according to the prior art.

FIG. 1 shows a high-voltage battery 1 for an electrically drivable motor vehicle. The high-voltage battery 1 has a plurality of battery modules 2 which are interconnected with one another and a line arrangement 3 according to the prior art. Each battery module 2 has a large number of battery cells 4 which are stacked one on the other in a stacking direction S. The battery modules 2 are arranged next to one another along a width direction B which is oriented transversely in relation to the stacking direction S. The line arrangement 3 according to the prior art has a large number of lines 5, 6 which are fastened to the battery modules 2 here. The lines 5 can be, for example, electrical cables, and the lines 6 can be, for example, coolant pipes. Here, the lines 5, 6 are laid individually or separately on a top side 7 of the battery modules 2 and have to be fastened there by means of separate fastening points. In addition, certain tolerances and minimum distances between the lines 5, 6 have to be complied with. Therefore, laying the lines 5, 6 in the high-voltage battery 1 is very complicated.

In addition, the battery cells 4 have degassing openings 8 on the top side 7 of the respective battery module 2, through which degassing openings a hot gas which is produced within the battery cell 4 can escape. One problem here is that the lines 5, 6 are also arranged on the top side 7 of the battery modules 2. In particular, the line sections of the lines 5, 6 which are arranged close to the degassing openings 8 could be destroyed by the hot gas which can be at temperatures of up to 1200° C.

Figure 2:
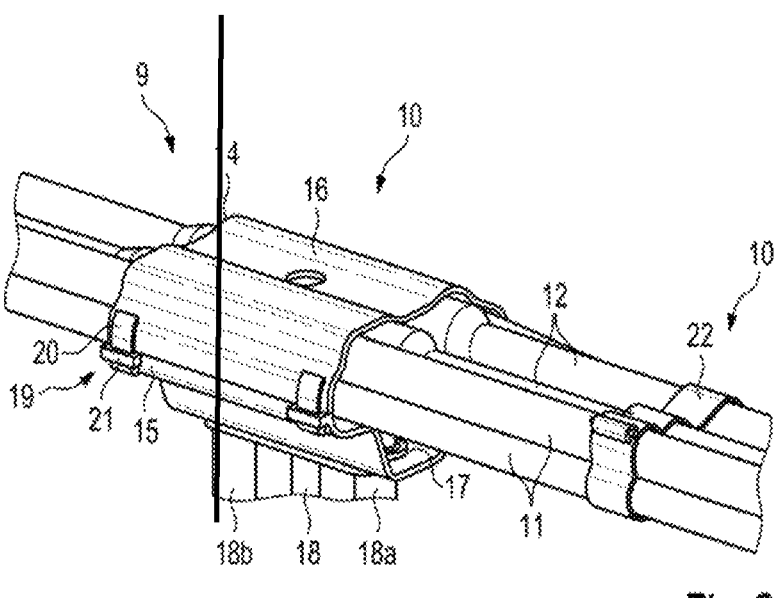
FIG. 2 is a schematic illustration of an embodiment of a line arrangement according to the invention.

FIG. 2 shows an embodiment of a line arrangement 9 according to an embodiment of the invention which can be arranged on the battery modules 2 of the high-voltage battery 1, instead of the line arrangement 3 according to FIG. 1. The line arrangement 9 has a line installation device 10 which is designed for laying lines 11, 12. The lines 11 are electrical lines here, in the present case high-voltage lines. However, the lines 11 can also comprise module connecting lines and/or communication lines or low-voltage lines. The lines 12 are coolant lines, wherein a first coolant line 12 is an inlet line and a second coolant line 12 is an outlet line. A coolant for cooling the battery cells 4 can be supplied to a cooling device, not shown here, of the high-voltage battery 1 via the coolant line 12. The cooling device can comprise a cooling plate with cooling ducts for each battery module 2 for example, wherein the cooling plates are arranged on bottom sides 13 (see FIG. 1) of the battery modules 2.

The line installation device 10 has at least one line clip 14. In particular, the line installation device 10 has a number of line clips 14 which corresponds to the number of battery modules 2, so that the lines 11, 12 can be supported on each battery module 2 by means of a line clip 14. The line clip 14 has a bottom part 15 which faces the top side 7 of the battery module 2, which top side has the degassing openings 8. In addition, the line clip 14 has a top part 16 which is arranged above the bottom part 15 in the vertical direction H. The line clip 14 is of two-part design here, so that the bottom part 15 and the top part 16 can be completely detached from one another. In the detached state of the bottom part 15 from the top part 16, the lines 11, 12 can be positioned in the top part 16. The bottom part 15 has passage openings 17 through which a coolant connection 18 of the coolant lines 12 can be guided. The coolant connection 18 can then be fluidically coupled to coolant nozzles, not shown here, of the cooling device of the battery modules 2. The coolant connection 18 is of T-shaped design here and to this end has two cooling ducts 18a, 18b. The first cooling duct 18a can be connected, for example, to the inlet line and can be connected to an inlet nozzle of a cooling plate, and the second cooling duct 18b can be connected to the outlet line and can be connected to an outlet nozzle of the cooling plate.

After the lines 11, 12 are arranged in the top part 16, the top part can be placed on the bottom part 15 and can be connected to the bottom part 15 by means of a snap-action connection 19. In order to form the snap-action connection 19, the top part 16 has a snap-action hook 20 here, which snap-action hook can be inserted into a corresponding loop 21 of the bottom part 5. Here, the line installation device 10 also has a line bundling element 22 which is also designed as a clip. This line bundling element is used for bundling and guiding the lines 11, 12.

This line arrangement 9 with the lines 11, 12 which are arranged in the line clips 14 can then be arranged on the battery modules 2 and fastened there, for example by way of the coolant connection 18 which is guided through the bottom part 15 being connected to the coolant nozzles. In this case, the line arrangement 9 is positioned on the top side 7 of the battery modules 2 in such a way that the line clips 14 are arranged in the region of the degassing opening 8. For example, an intermediate pressure plate through which the coolant nozzles are guided from the bottom side 13 to the top side 7 of the battery module 2 can be arranged centrally in the battery module 2 along the stacking direction S. To this end, the intermediate pressure plate can have passage openings which are oriented along the vertical direction H and are arranged centrally in the intermediate pressure plate along the width direction B. The coolant connection 18 can be screwed to the intermediate pressure plate by means of, for example, self-tapping screws. The degassing openings 8 are likewise arranged centrally on the top side 7 of the battery modules 2 along the width direction B. When the coolant connection 18 is plugged onto the coolant nozzles, the line clip 14 is arranged between two degassing openings 8 in the stacking direction S.

In order to now prevent the lines 11, 12 from being damaged by the hot gas, the line clip 14 contains a refractory or heat-resistant material. In particular, at least the bottom part 15, preferably also the top part 16, is formed from the refractory material. The refractory material can be, for example, a glass fiber-reinforced polyamide which is admixed with red phosphorus. The line clip 14 can be designed, for example, as an injection-molded part composed of the glass fiber-reinforced polyamide which is admixed with red phosphorus. However, it may also be the case that at least the bottom part 15 is coated with a metal material on an outer side which faces the top side 7. For example, the line clip 14 can be produced from plastic in this case, wherein at least the outer side of the bottom part 15 has the metal coating. This refractory material prevents the heat of the hot gas from passing through to the lines 11, 12 and destroying the lines.

LIST OF REFERENCE SIGNS

1 High-voltage battery
2 Battery module
3 Line arrangement
4 Battery cell
5 Electrical cable
6 Coolant pipes
7 Top side of the battery module
8 Degassing element
9 Line arrangement
10 Line installation device
11 Electrical lines
12 Coolant lines
13 Bottom side of the battery module
14 Line clip
15 Bottom part
16 Top part
17 Passage opening
18 Coolant connection (T-shaped)
18a, 18b Cooling ducts
19 Snap-action connection
20 Snap-action hook
21 Loop
22 Line bundling element
B Width direction
S Stacking direction
H Vertical direction
What is claimed is:

1. A high-voltage battery system comprising:
a high-voltage battery of a motor vehicle;
a line installation device that is configured to lay lines of the high-voltage battery on at least one battery module of the high-voltage battery;
a line clip configured to retain at least a first line and configured to retain a second line, wherein
the first line is an electrical line,
the second line is a coolant line, the line clip is configured to guide the first line and the second line as a line bundle over a given side of the at least one battery module,
the given side has degassing openings of battery cells of the at least one battery module,
the line clip contains a refractory material configured to protect the first line and the second line against a hot gas which passes out of the degassing openings,
the line clip has a bottom part, which faces a side with the degassing openings of the at least one battery module, and a top part which is situated opposite the bottom part,
the first and second lines are arranged between the bottom part and the top part,
at least one outer side, which faces the side with the degassing openings of the at least one battery module, is formed from the refractory material,
the bottom part has at least one passage opening configured to guide a coolant connection of the at least one coolant line through to at least one coolant nozzle of a cooling device of the at least one battery module, and
wherein the line clip is arranged between two degassing openings of two adjacent battery cells of the at least one battery module.

2. The high-voltage battery system according to claim 1, wherein the line clip is formed, at least in regions, from a refractory material including a glass fiber-reinforced polyamide which is admixed with red phosphorus.

3. The high-voltage battery system according to claim 1, wherein the line clip is coated, at least in regions, with a refractory material in the form of a metal material.

4. The high-voltage battery system according to claim 1, wherein the top part and the bottom part are connected via a hinge on one side.

5. The high-voltage battery system according to claim 1, wherein the line clip is of two-part design and the top part and the bottom part are connected in an interlocking manner via a snap-action connection.

6. The high-voltage battery system according to claim 1, wherein the refractory material is a polyamide with a DIN abbreviation PA 66 GF 30.

7. The high-voltage battery system according to claim 1, wherein the clip is formed of a plastic and has a cold plasma sprayed metal layer only on an outer side which faces the degassing openings.

8. The high-voltage battery system according to claim 1, wherein the cooling device comprises a cooling plate with cooling ducts for each battery module, such that a plurality of cooling plates are arranged on bottom sides of the battery modules.

9. The high-voltage battery system according to claim 1, wherein the line installation device is configured to guide the first line and the second line over the given side of the at least one battery module substantially perpendicularly to a stacking direction of the battery cells.

10. The high-voltage battery system according to claim 1, wherein at least the bottom part of the line clip is completely formed from the refractory material.

* * * * *